Patented Dec. 4, 1928.

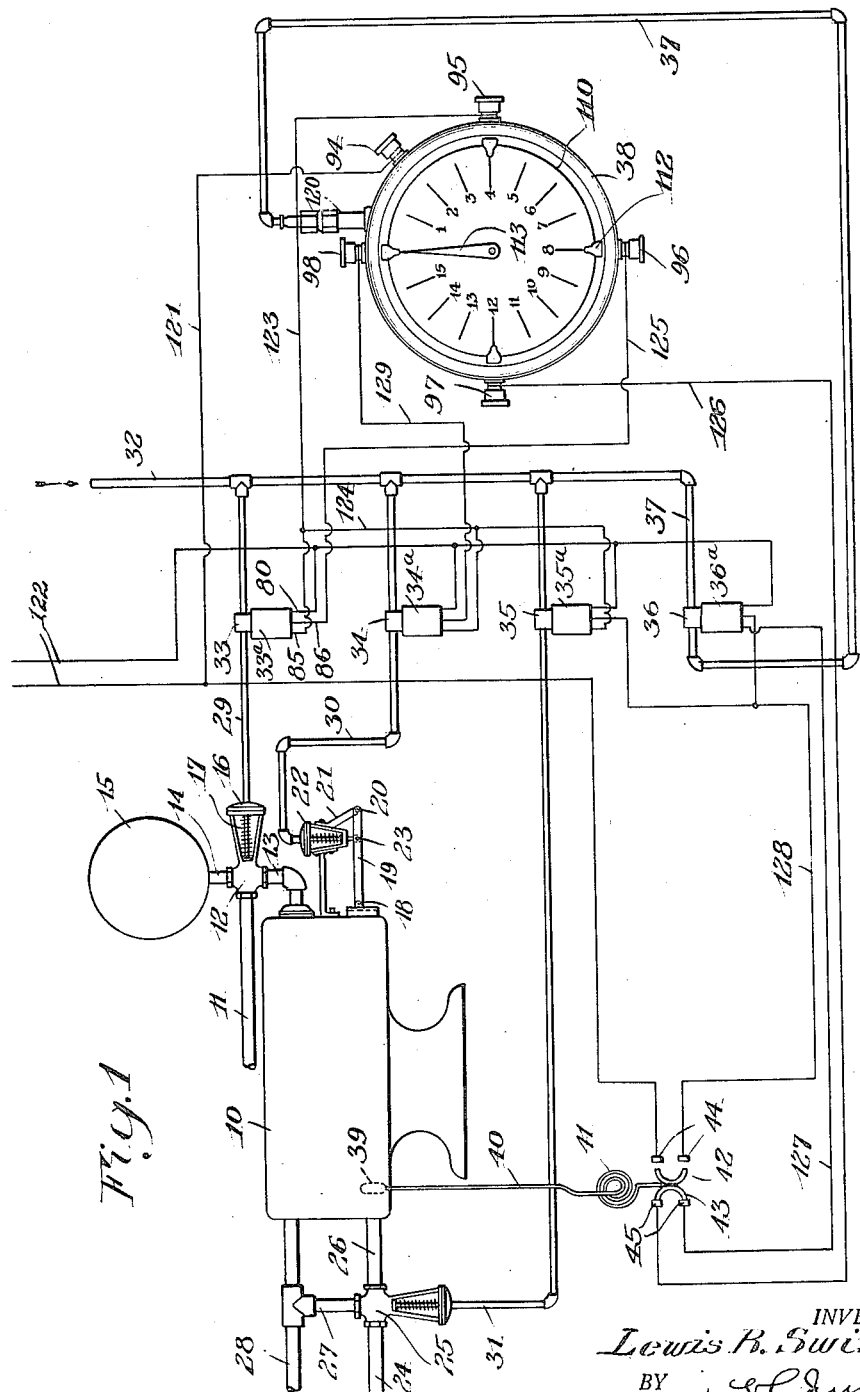

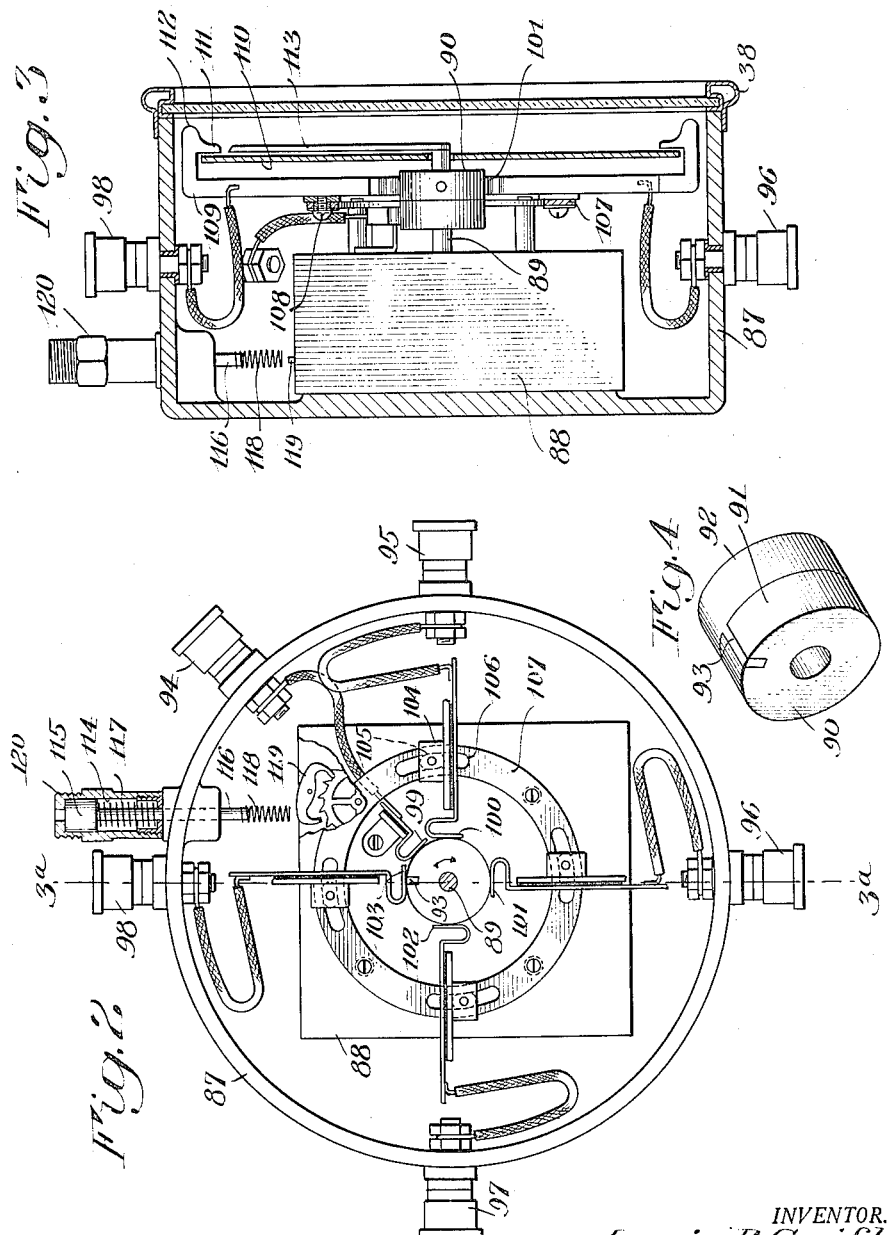

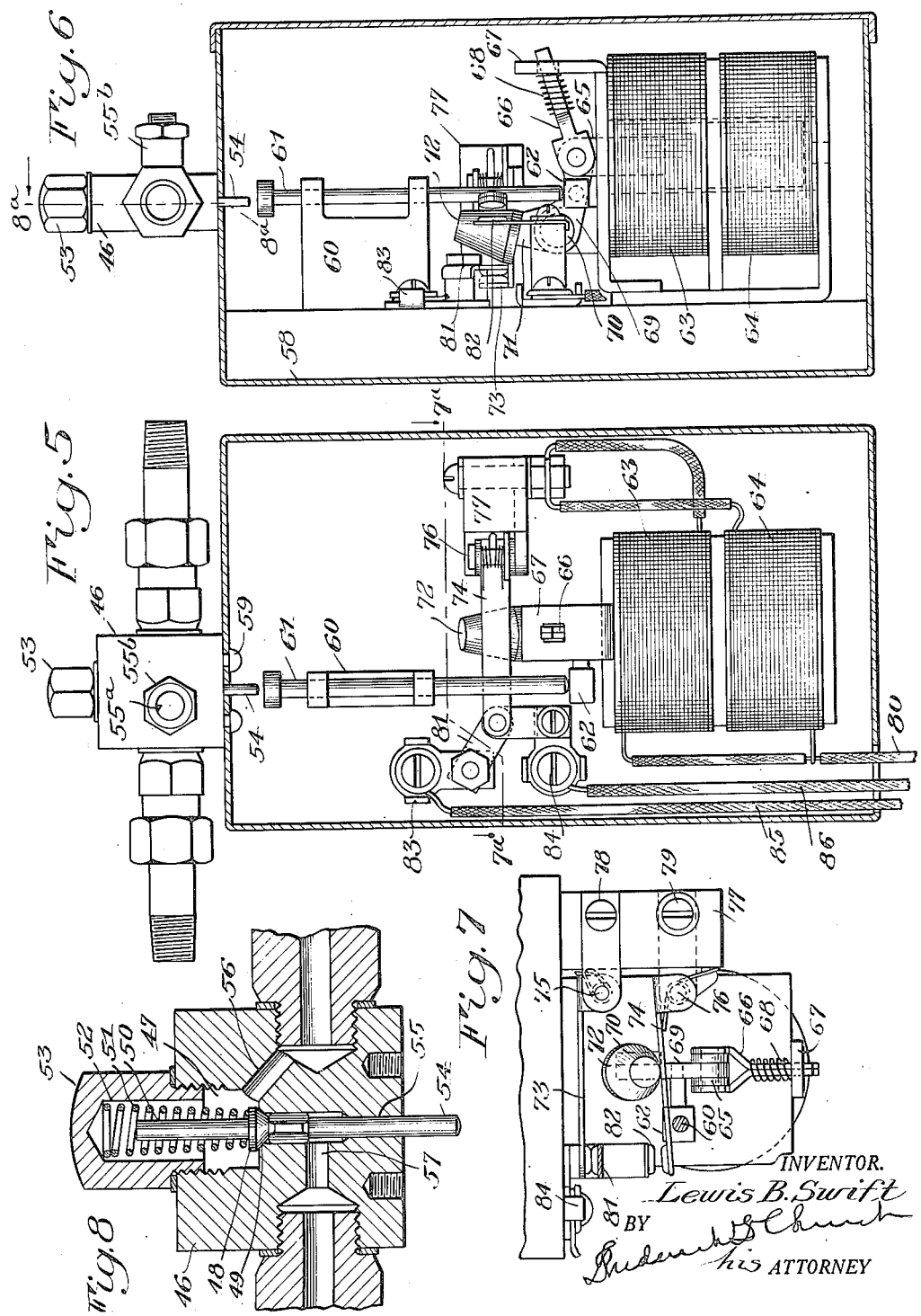

1,693,677

UNITED STATES PATENT OFFICE.

LEWIS B. SWIFT, OF ROCHESTER, NEW YORK, ASSIGNOR TO TAYLOR INSTRUMENT COMPANIES, OF ROCHESTER, NEW YORK, A CORPORATION OF NEW YORK.

PROCESS-CONTROL SYSTEM.

Application filed January 31, 1924. Serial No. 689,828.

This invention relates to the automatic control of processing operations, and more particularly to apparatus for automatically controlling the operation of processing equipment, as for example, the filling or emptying of a processing container, and the regulation of temperature or other conditions in the same in accordance with a predetermined timed sequence of operating steps, one object of the invention being to provide a practical and effective apparatus of this character adapted for application to a wide variety of uses and conveniently adjustable to suit the varying requirements of any particular use, for efficiently accomplishing a process under accurate and economical regulation.

Another object is to provide an apparatus of this nature of a comparatively simple construction operating in a positive and reliable manner and including a unitary control mechanism convenient to adjust and adapted for location at any desired distance from the processing equipment itself.

A further object is to provide such apparatus comprising efficient motor devices for accomplishing the desired operations, reliably controlled through advantageous relay means operated in a fully automatic manner and from any desired distance by a unitary control mechanism.

To these and other ends the invention consists in certain improvements and combinations of parts, all as will be hereinafter more fully described, the novel features being pointed out in the claims at the end of the specification.

In the drawings:

Figure 1 is a general view, partly diagrammatic, of a processing container having a control apparatus applied thereto embodying the present invention;

Figure 2 is an enlarged front elevation of a control mechanism shown in Figure 1, with a portion of the casing removed to disclose the working parts;

Figure 3 is a sectional elevation on the line 3ª—3ª in Figure 2;

Figure 4 is an enlarged perspective view of an electrical contact drum shown in Figures 2 and 3;

Figure 5 is an enlarged elevation, partly in section, of a control device comprising solenoid means and a valve operated thereby;

Figure 6 is an elevation of the same as viewed from the left in Figure 5;

Figure 7 is a sectional plan view on the line 7ª—7ª in Figure 5, and

Figure 8 is an enlarged sectional view on the line 8ª—8ª in Figure 6.

Similar reference numerals throughout the several views indicate the same parts.

The present invention is capable of a wide variety of useful applications of the character indicated above, one of which, herein disclosed by way of illustration, is for the automatic control of a container for processing or freezing ice cream mixtures. This process involves the filling of the container with the material to be processed, the control of a supply of a temperature controlling medium for regulating the temperature in and the discharge of the mixture from the container at the end of the desired period of treatment, after which the process is repeated, and the invention provides an apparatus for carrying out and repeating such a process in a fully automatic manner. More specifically, the present process includes the holding of the material substantially at a predetermined temperature and for a predetermined time before discharge from the container, and this is also accomplished by the apparatus in the same automatic manner.

In the particular modification of the apparatus herein disclosed, the filling and emptying of the container and the supply of the cooling medium are controlled by valves operated automatically in a predetermined time sequence by control mechanism, and a sensitive device, subjected and responsive to the temperature of the container, operates also to control the flow of the cooling medium as well as the action of the control mechanism itself. The latter is in the present instance of the electrical contact variety operating circuits including solenoids which in turn operate the secondary valves of a fluid pressure system employed to operate the main valves of the apparatus.

Referring more particularly to the drawings, there is shown at 10, Figure 1, a freezing container to which the mixture is supplied through a pipe 11 leading from a suitable source of supply. This pipe is fitted with a three-way automatic valve 12, one of the branches of which is connected by a pipe 13 with the inlet of the container. The other valve branch is connected by means of the pipe 14 with a batch measure 15. Valve 12 is in the present instance of the variety operated by a fluid pressure diaphragm 16 and an opposed spring 17, the application of fluid pressure to the diaphragm serving to position the valve to transmit a measured batch of the mixture to be treated from the measure 15 to the container. Removal of fluid pressure permits spring actuation of the valve to position for closing pipe 13 and connecting the supply pipe 11 with the batch measure 15 to fill the latter for a subsequent processing cycle.

The container is provided with a discharge valve of any suitable nature having the form in the present instance of a vertically sliding door 18. Pivotally connected with the door is an operating lever 19 pivotally supported at its other end 20 on a fixed bracket 21 carried by the container and supporting a motor device 22 of the spring and diaphragm variety described above. The stem of this device is pivotally connected at 23 with the lever 19 so that the application of fluid pressure forces the lever downwardly and closes the discharge outlet of the container.

Container 10 is in the present instance equipped with a jacket or coils for the circulation of a temperature controlling or cooling medium, such as brine, supplied thereto through a pipe 24. The latter includes a three-way valve 25 having one branch 26 connected with the container and the other branch 27 with a return pipe 28 also connected with the container. Valve 25 is of the automatic spring and diaphragm variety described above and so arranged that the application of fluid pressure moves the valve to position to close pipe 27 and connect pipes 24 and 26 to cause the brine to circulate and cool the container contents. The removal of fluid pressure positions the valve to close pipe 26 and connect pipes 24 and 27, causing the brine to be by-passed to the return pipe 28 so that its cooling effect upon the container is discontinued.

Valves 12, 22 and 25 are supplied with compressed air through secondary pipe lines 29, 30 and 31 respectively, leading to a manifold 32 adapted for connection with a suitable supply of air under pressure. These secondary air lines are respectively controlled by secondary valves 33, 34 and 35, the construction of which is more particularly described hereafter. An additional secondary valve 36 controls a secondary air line 37 leading from the manifold to a unitary control mechanism 38 hereafter described, adapted to be located at a distance from the position of the processing container. Secondary valves 33 to 36 inclusive are operated by solenoid means hereafter described and connected with and controlled by the mechanism 38 which comprises switch contacts with suitable means for operating the same in the desired time sequence.

A sensitive device, in the present instance a thermometer bulb 39, is subjected to the temperature of the mixture in the container. This bulb is part of a fluid filled system, preferably of the well-known capillary type, schematically shown at 40 as communicating at its other end with a responsive element or spiral tube 41, such as the well known Bourdon tube, adapted to have its free outer end moved in response to variations in pressure in the thermometer system corresponding to varying temperature in the container. The moving end of coil 41 is connected with and moves a pair of bridging contacts 42 and 43 cooperating respectively with pairs of contacts 44 and 45 for connecting one or the other of these pairs of contacts and closing corresponding circuits, which circuits are connected with means, as later appears, for controlling the temperature control valve 25, conjointly with the control thereof by the mechanism 38, as well as for controlling the operation of the latter mechanism itself in accordance with the temperature of the container.

The secondary valves 33 to 36 inclusive may be of various known or suitable constructions, such, for example, as shown in Figure 8, being the same for each valve. This construction comprises in the present instance a valve block 46 chambered at 47 for the reception of a valve 48 cooperating with a seat 49. The stem 50 of the valve has coiled thereabout a spring 51 bearing at one end against the valve and at the other against the end of a socket 52 formed in a cap 53 screwed into the end of chamber 47. Spring 51 thus tends to urge the valve toward its seat from which however it may be raised by a stem 54 extending through a bore 55 communicating with chamber 47 through the valve seat. The stem projects for a distance as shown beyond the bottom of the casing for operation by means to be described. Compressed air is supplied to chamber 47 through a port 56 connected by piping with the manifold 32 and a port 57 communicates with the chamber through the valve seat by connection with an enlarged portion of the bore in which the valve stem operates. Port 57 is connected by a pipe line with the automatic valve to be controlled. It is apparent from this construction that raising valve stem 54 by pressure against its lower end tends to unseat the normally closed valve and permit the transmission of fluid pressure. Bore 55 is connected with the atmosphere by a small vent 55ᵃ in a nipple 55ᵇ.

The solenoid means for operating each of the valves 33 to 36 inclusive is the same, and in the present instance of a variety, shown in Figures 5 to 7, adapted to be moved and temporarily held in either of two directions for either holding the secondary valve open or permitting it to remain closed under the action of the valve spring. This solenoid means is shown as housed in a casing 58 secured as by means of screws 59 to the valve block 46, the casing having an opening to permit the valve stem 54 to extend within the same. Sliding vertically in bearings in a bracket 60 mounted on the wall of the casing is a connecting plunger 61 aligned with valve stem 54. The upper end of the plunger is positioned for operating the valve stem while its lower end rests upon a lug 62 connected with the vertically moving solenoid armature for operation thereby.

The solenoid means for operating each of the secondary valves comprises preferably a pair of opposed windings 63 and 64, Figures 5 and 6, in the form of coils supported by bracket means on the back wall of the casing, as shown, and having in common the longitudinally movable armature or plunger 65 referred to above. Energization of one of the windings, as for example 63, serves to raise the armature, while energization of the other winding lowers it. The upper end of the armature has pivotally connected therewith an arm 66, the other end of which works loosely in an opening in an ear 67 carried by the bracket means on the casing wall. A spring 68 coiled about the arm and bearing against a shoulder of the latter and the ear 67 provides with the arm an overthrow or retaining device for the armature tending to retain it in either raised or lowered position after movement thereto by energization of one or the other of the windings. Pivotally connected with the upper end of the armature also is one arm of a bell crank lever 69 pivotally supported by the bracket means at 70 and carrying also the valve operating lug 62 previously described. The other end upwardly extending arm 71 of the lever carries a cone shaped head 72 of insulating material for operating pairs of switch contacts arranged on its opposite sides, as the armature is raised or lowered, these contacts being connected in series with windings 63 and 64, respectively, for connecting the same alternately in circuit to effect alternate raising and lowering of the armature.

These solenoid controlling contacts comprise spring actuated switch arms 73 and 74 on opposite sides of the actuating head 72, the arms being pivotally supported at 75 and 76 respectively on a bracket 77 having binding posts 78 and 79 respectively. Binding post 78 is connected as shown with winding 63 and post 79 with winding 64. The other ends of these windings are connected to a wire 80 leading to one side of the main electrical supply line as hereafter described. Cooperating with the contact ends of switch arms 73 and 74 are contacts 81 and 82, respectively, carried by suitable supporting means as shown on the casing wall, including binding posts 83 and 84 connected by means of conductors 85 and 86, as hereafter described. It is apparent from this construction that with the armature in its lower position, as shown in Figures 5 and 6, the application of current through conductor 85, switch contact 81, switch arm 73 engaged therewith and winding 63, tends to raise the armature which remains in raised position through the action of arm 66 and springs 68, opening the secondary air valve and maintaining it open so long as the armature is left in raised position. The elevation of the armature also engages switch arm 73 through which the current flowed to raise it, and moves it out of engagement with its contact 81 thus opening the winding of circuit 63. Such upward movement of the armature also releases the opposite switch arm 74 which was engaged by the armature head 72 in the lower position of the latter, so that switch arm 74 is actuated by its spring into engagement with its contact 82, thus closing the circuit of winding 64 at this point. The application of power thereafter through conductor 86 energizes winding 64 to lower the armature which allows the secondary valve to close. The armature is retained by the means described in its lower position and readjusts the switch arms 73 and 74 as described, for elevation of the armature at its next operation.

The circuit connections of the solenoid means for the secondary valves 33 to 36 can be more clearly described after an understanding is had of the control mechanism which will now be described. This mechanism as shown in Figures 2, 3 and 4, comprises, preferably a cylindrical casing 87 on the back wall of which is supported a driving means or motor in the present instance in the form of a spring actuated clock of any suitable variety in a casing 88, wound and set by suitable means which may be of any well known variety and requires no detailed description. The clock rotates a forwardly extending spindle 89 on which is fixed a contact drum indicated generally at 90, Figure 4. This drum comprises a circumferential section 91 of insulating material and a similar section 92 of conducting material having a conducting strip 93 extending longitudinally across the insulating section 91. Mounted in the circumferential wall of the casing is a series of spaced binding posts, 94 to 98 inclusive. Binding post 94 is connected as shown with a stationary spring contact 99 fixed on the clock casing and bearing against the conducting portion 92 of the drum 90. The other binding posts 95 to 98 inclusive are connected with spring contacts 100 to 103 inclusive, respectively, each of which contacts is supported for circumferential adjustment about the spindle 89 as a center. Such supporting means comprises, preferably, a shoe 104 for each contact having an elongated lug 105 sliding in an arcuate slot 106 in an annular bridge plate 107 fixed on the casing. A screw 108 passed through the slot 106 and threadedly engaged with the shoe secures the latter adjustably to the bridge 107 with sufficient friction to hold the shoe and the contact carried thereby in any position to which it may be adjusted by sliding the same circumferentially on the bridge, the shoe being held against turning by the engagement of the lug in the slot. Each shoe has an extension arm 109 carried radially outward and angularly forward around the periphery of a dial plate 110 graduated as shown in Figure 1 to represent in this instance the duration of the process in minutes. Each arm 109 is preferably formed to provide a pointer 111 cooperating with the dial graduations and is so shaped, as at 112, as to afford a portion adapted to be manually engaged for adjusting the shoe and contact circumferentially in the manner described above. Spindle 89 is extended through the dial and provided with a pointer 113 also cooperating with the graduations to indicate the rotary position of drum 90. It is apparent from this construction that as the drum is rotated by the clock, different circuits are closed in timed sequence through the different contacts engaged with the drum at points in the process which may be conveniently carried through a substantial range by the adjustment of the contacts, while the positions of the latter are clearly indicated on a dial by the pointers 111 and the position of the drum by the pointer 113.

Means are provided for automatically starting and stopping the operation of the controller mechanism driving means or clock 88, comprising preferably a pneumatic cylinder 114 on the clock casing and in which slides a piston 115. The latter has a depending stem 116 sliding in a bearing in the lower end of the cylinder and a compression spring 117 coiled about the stem between the piston and the cylinder end tends to yieldably hold the piston in its upper position. The lower end of the stem extends within the clock casing and carries a resilient element or coiled spring 118 positioned for engaging and disengaging an escapement pawl 119 controlling the clock. The upper end of the cylinder is threaded as at 120 for the connection thereto of the air pipe 37 controlled by the secondary valve 36 as already described. As apparent from this construction, spring 117 normally holds the piston stem spring elevated free of the escapement to permit the clock to run, but upon application of fluid pressure to the upper end of the cylinder by the opening of valve 36, the piston stem is forced downwardly to bring its terminal spring against the escapement pawl to hold the latter against movement and stop the clock. Upon release of the fluid pressure, the piston stem spring is moved away from the escapement pawl and in such movement its terminal spring 118 acts resiliently upon the escapement pawl to start the operation of the clock. This clock starting and stopping device is jointly controlled as hereafter explained by the controller mechanism 38 itself which, at one period in the process, supplies pressure to the device and stops the driving clock mechanism, and also by the sensitive device 41 which, at another point in the process, functions to relieve the pressure and start the clock and the mechanism 38.

As shown in Figure 1, binding post 94 of the controlling mechanism 38 is connected by a conductor 121 with one side of an electrical supply line 122. Power is supplied from this binding post to the fixed contact 99 to the drum 90. The latter rotates clockwise and the conducting strip or contactor 93 first engages the adjustable contact 100. This contact is connected through its binding post 95 and a conductor 123 with the conductor 85 of a solenoid 33$^a$ controlling the secondary valve 33. The solenoid armature is at this time in lower position with valve 33 closed and the closing of the circuit as described operates to raise the armature and open valve 33, admitting pressure to valve 12 which is thereby automatically positioned to open communication between the batch measure 15 and the container, to permit material to be processed to flow into the latter. It is to be noted that conductor 123 is connected by a conductor 124 with conductor 85 of the solenoid 34$^a$ controlling secondary valve 34, so that this armature also is raised simultaneously with the operation of valve 33 whereby valve 34 is opened and pressure transmitted through pipe 30 to the actuating device 22 to operate lever 19 and close the container discharge valve or door 18. At the same time also, a connection between conductor 124 and conductor 85 of the solenoid 35$^a$ controlling secondary valve 35 provides for the simultaneous opening of this valve with valves 33 and 34 to transmit pressure through pipe 31 and position valve 25 for supplying brine to the container to start the cooling of the mixture as the latter is supplied as described from the batch measure.

The process having thus been started, drum 90 of the controller mechanism continues to rotate until its contactor 93 engages contact 101 connected with binding post 96 and through a conductor 125 with conductor 86 of the solenoid controlling valve 33. This operates in the manner described to lower the solenoid armature, permitting the valve 33 to close and shut off pressure from the valve 12 which is then positioned by its spring to close communication with the container and connect the supply line 11 with the batch measure 15, to fill the latter for the next processing cycle.

Drum 90 continues to revolve until its contactor 93 engages contact 102 connected with binding post 97 and through a conductor 126 with the switch contacts 45 which at this time are bridged by the bar 43, the temperature responsive device having not yet functioned. From the switch 45 the current passes through a conductor 127 to the conductor 85 of the solenoid 36ª controlling secondary valve 36 which is then opened, admitting pressure to the device for stopping the clock. The controller mechanism is thus brought to rest temporarily while the material continues to be processed or cooled. When the temperature of the material is lowered by the circulation of the temperature controlling medium or brine to the degree at which the responsive device 41 is set to operate, the latter then disconnects contacts 45 and connects contacts 44. Contacts 44 are connected with one side of the power line 122 and through a conductor 128 with conductor 86 of the solenoid of secondary valve 36, and this valve is thereby closed in the manner described to shut off pressure from the clock starting and stopping device. The latter thereupon functions as described to again start the clock and control mechanism, it being noted that control of this starting device by the control mechanism itself through contact 102 and switch 45 is first interrupted by the opening of the latter switch prior to the described starting operation to prevent interference should the drum stop with its contactor still engaged with contact 102.

At the same time that the temperature responsive device again places the control mechanism in operation, it also operates valve 25 to by-pass the brine, since the usual insulated construction of the container enables it to remain substantially at the temperature which has been attained. This additional operation is accomplished by the connection of conductor 128 from switch 44 to the contact 86 of the solenoid controlling second valve 35. This solenoid armature is thus lowered to permit closing of the valve and relief of pressure, so that valve 25 is operated by its spring to by-pass the brine.

The container having thus been brought to the desired processing or freezing temperature, is allowed to stand at this temperature for the period of time required to complete the processing of the material. During this period, contactor 93 is rotating from contact 102 to contact 103. When the latter is engaged a circuit is completed through this latter contact, binding post 98 and a conductor 129 to the terminal 86 of the solenoid controlling secondary valve 34 to close the latter. This relieves air pressure on the device 22 so that its spring acts to open the container discharge valve or door 18 to empty the container at the proper time, thus completing the process cycle. Contactor 93 continues to rotate into engagement again with contact 99, thereby closing the circuit through conductor 123 leading to the solenoid means of valves 33, 34 and 35 which are again operated to admit pressure to valves 12, 22 and 25 for closing the container discharge valve, refilling the container and starting the circulation of the temperature controlling medium or brine, as previously described.

It is apparent that the various contacts 100 to 103 inclusive may be conveniently adjusted by hand, each through a range of positions for varying the time at which it is brought into operation to effect a step in the process. One or more of these contacts may be omitted from use and they may also be connected to other or additional valves or other automatic means for accomplishing different process steps. The control mechanism is thus readily adaptable to the control of various pipes of processing equipment and under different conditions and requirements.

The operation of the apparatus has been described in detail in connection with the foregoing description of its construction, and may be summarized as follows: With the container discharge valve 18 open and the container thereby emptied, the batch measure 15 is filled through supply pipe 11 and the brine by-passed through pipe 27, which is the condition of the apparatus after the engagement of contactor 93 with contact 103, the clock is started to drive control mechanism 38. Contactor 93 first engages contact 100 to close the circuit, opening secondary valves 33, 34 and 35 to admit pressure to valves 12, 22 and 25. This closes the container discharge valve, opens communication from the batch measure to the container to fill the latter, and at the same time circulates the brine about the container. Contactor 93 then engages contact 101, permitting valve 33 to close and relieve pressure on valve 12 which is spring actuated to disconnect the batch measure from the container and connect it with the supply line 11 preparatory for the next cycle. Contactor 93 next engages contact 102, completing the circuit through conductor 126, switch 45 and the solenoid of valve 36 which is opened to admit pressure to the clock cylinder 114 for stopping the clock and placing the apparatus temporarily under control of the temperature responsive device 41. As the temperature falls this device is actuated at the degree for which it is adjusted, as well understood in the art, and switch 45 is opened while switch 44 is closed. Closing the latter completes circuits through valves 35 and 36 which are allowed to close relieving pressure on valve 25 and the clock starting means. Thus at the predetermined temperature, the brine is bypassed through pipe 27 and the clock started. The apparatus is thus again placed under control by the mechanism 38 which times the subjection of the material to the attained temperature until contactor 93 engages contact 103, thereby closing the circuit through conductor 129 and the solenoid of valve 34 to permit the closing of the latter and the opening of the discharge door 18, thus completing the cycle.

The invention thus provides a comparatively simple and thoroughly practical and efficient system adapted for accurately and economically controlling various processes in a conveniently flexible manner, and while the invention is specifically described herein in its application to the control of a material cooling equipment it is obvious that it may be applied as well to the control of processes involving the regulation of other conditions within the container as for example by the supply of a heating or pressure producing medium.

I claim as my invention:

1. In apparatus of the character described, the combination with a treater vessel having an inlet, an outlet and a conduit for passing a fluid medium through the vessel to effect a heat exchange with the contents thereof, of separate means for controlling the flow of material through the inlet, the outlet and the said conduit respectively, means for automatically actuating the said controlling means to effect the admission, the treatment and the discharge of the material in orderly sequence, including motor mechanism, means operative at a predetermined point of the cycle of operation to make the motor means ineffective and means responsive to changes of conditions in the treater vessel for making the motor means effective.

2. In apparatus of the character described, the combination with a treater vessel having an inlet, an outlet and a conduit for passing a fluid medium through the vessel to effect a heat exchange with the contents thereof, valve mechanisms for separately controlling the flow of material through the inlet, the outlet and the said conduit respectively and means for automatically actuating said valve mechanisms in orderly sequence, comprising separate valve actuating means, time-controlled means for controlling the said valve actuating means, means operatively connected with the time-controlled means for making the latter ineffective and means responsive to changes of conditions in the treater vessel for making the time-controlled means effective.

3. In apparatus of the character described, the combination with a treater vessel having an inlet, an outlet and a conduit for passing a fluid medium through the vessel to effect a heat exchange with the contents thereof, valve mechanisms for separately controlling the flow of material through the inlet, the outlet and the said conduit respectively and means for automatically actuating said valve mechanisms in orderly sequence, comprising separate valve actuating means, means for separately controlling the valve-actuating means, including a plurality of angularly spaced contacts and a rotary contact element for co-operation therewith, and means for governing the rotary motion of the contact element, including means associated therewith for stopping it in a definite angular position and means including an element responsive to changes of conditions within the treater vessel for making the said stopping means ineffective.

4. In apparatus of the character described, the combination with a treater vessel and means for controlling the treating operation, including a plurality of valves, of means for actuating the same in cyclic order, including a plurality of angularly spaced contacts, a rotary contact element for co-operation therewith and means for governing the rotary motion of the contact element, including means associated therewith for stopping it in a definite angular position and means including an element responsive to changes of condition within the treater vessel for making the said stopping means ineffective.

5. In apparatus of the character described, the combination with a treater vessel, of means for feeding material into the vessel, means for circulating a heat exchange medium through the vessel out of physical contact with the contents thereof, means for discharging the material from the vessel, and means operative to control said operations to simultaneously start the feeding of the material into the vessel and the circulation of the heat exchange medium, to continue the said circulation after the vessel is fully charged until the material to be treated has reached a definite condition, to stop the circulation when said condition has been reached, to maintain the material in the vessel a predetermined period after the circulation has been stopped and to discharge the material from the vessel at the end of said period, the said controlling means including means responsive to conditions within the vessel for stopping the circulation of the heat exchange medium.

6. In apparatus of the character described, the combination with a treater vessel, of means for feeding material into the vessel, means for circulating a heat exchange medium through the vessel out of physical contact with the contents thereof, means for discharging the material from the vessel and means operative to control all said means in orderly sequence so as to simultaneously start the feeding operation and the circulation of the heat exchange material, to continue the said circulation after the vessel has been fully charged, until the material to be treated has reached a definite condition, to maintain the material in the vessel a predetermined period after the said definite condition has been reached and to discharge the material treated at the end of said period, the said controlling means including a rotary mechanism for successively acting upon the feeding means, the circulation means and discharge means, means connected with the rotary mechanism for stopping the latter at a definite point of its angular motion and means responsive to conditions within the vessel for starting the rotary mechanism when a definite condition has been reached within the vessel.

LEWIS B. SWIFT.